United States Patent
Gill et al.

(10) Patent No.: US 8,862,710 B2
(45) Date of Patent: Oct. 14, 2014

(54) DYNAMIC CONFIGURATION OF MOBILE STATION LOCATION SERVICES

(75) Inventors: Regan Gill, Berkeley, CA (US); Ge Xia, Albany, CA (US); Kevin Masao Tsurutome, San Francisco, CA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 692 days.

(21) Appl. No.: 12/222,892

(22) Filed: Aug. 19, 2008

(65) Prior Publication Data

US 2009/0070445 A1 Mar. 12, 2009

Related U.S. Application Data

(60) Provisional application No. 60/960,019, filed on Sep. 11, 2007.

(51) Int. Cl.
| | |
|---|---|
| H04W 4/00 | (2009.01) |
| H04W 24/00 | (2009.01) |
| H04J 3/00 | (2006.01) |
| H04L 12/66 | (2006.01) |
| H04M 1/66 | (2006.01) |
| H04M 3/42 | (2006.01) |
| H04M 3/00 | (2006.01) |
| G06F 15/16 | (2006.01) |
| G06F 15/177 | (2006.01) |
| G06F 15/173 | (2006.01) |
| H04M 1/725 | (2006.01) |

(52) U.S. Cl.
CPC ...... *H04M 1/72572* (2013.01); *H04M 2250/10* (2013.01)
USPC ........... 709/222; 370/328; 370/338; 370/352; 370/356; 455/411; 455/416; 455/419; 455/434; 455/456.1; 709/205; 709/219; 709/220; 709/223; 709/249

(58) Field of Classification Search
None
See application file for complete search history.

(56) References Cited

U.S. PATENT DOCUMENTS

| | | | |
|---|---|---|---|
| 5,359,529 A | 10/1994 | Snider | |
| 5,832,408 A | 11/1998 | Tamai | |
| 6,064,941 A | 5/2000 | Nimura | |
| 6,119,013 A | 9/2000 | Maloney | |
| 6,185,427 B1 * | 2/2001 | Krasner et al. | 455/456.2 |
| 6,317,686 B1 | 11/2001 | Ran | |

(Continued)

FOREIGN PATENT DOCUMENTS

| | | |
|---|---|---|
| EP | 1128163 | 8/2001 |
| JP | 2008 039698 | 2/2008 |
| WO | WO2006/125291 | 5/2005 |
| WO | WO2006/071271 | 6/2005 |

OTHER PUBLICATIONS

Smith, Don; How to: Use the Nokia N95 GPS/A-GPS, Aug. 16, 2007, http://www.simplysymbian.com/2007/08/16/how-to-use-the-nokia-n95-gpsa-gps/.*

(Continued)

*Primary Examiner* — Moustafa M Meky
*Assistant Examiner* — Ho Shiu
(74) *Attorney, Agent, or Firm* — William H. Bollman

(57) ABSTRACT

On startup, a mobile station application will determine the current carrier network and submit a query to an application server that will return the correct location server configuration for the specified network. This information will be used on the mobile station to dynamically configure the device through the available GPS chipset API.

12 Claims, 5 Drawing Sheets

(56) References Cited

U.S. PATENT DOCUMENTS

| | | | |
|---|---|---|---|
| 6,377,810 B1* | 4/2002 | Geiger et al. | 455/456.2 |
| 6,401,034 B1 | 6/2002 | Kaplan | |
| 6,424,912 B1 | 7/2002 | Correia | |
| 6,434,482 B1 | 8/2002 | Oshida | |
| 6,470,189 B1 | 10/2002 | Hill et al. | |
| 6,480,783 B1 | 11/2002 | Myr | |
| 6,487,495 B1 | 11/2002 | Gale | |
| 6,507,785 B1 | 1/2003 | Stefan | |
| 6,529,143 B2 | 3/2003 | Mikkola | |
| 6,571,169 B2 | 5/2003 | Miyaki | |
| 6,587,782 B1 | 7/2003 | Nocek | |
| 6,628,938 B1* | 9/2003 | Rachabathuni et al. | 455/456.3 |
| 6,636,803 B1 | 10/2003 | Hartz | |
| 6,820,092 B2 | 11/2004 | Nakano | |
| 6,862,524 B1* | 3/2005 | Nagda et al. | 701/420 |
| 6,940,407 B2 | 9/2005 | Miranda-Knapp | |
| 6,954,697 B1 | 10/2005 | Smith | |
| 6,963,748 B2* | 11/2005 | Chithambaram et al. | 455/456.1 |
| 6,976,253 B1* | 12/2005 | Wierman et al. | 717/177 |
| 7,054,743 B1 | 5/2006 | Smith | |
| 7,093,286 B1* | 8/2006 | King | 726/12 |
| 7,155,339 B2 | 12/2006 | Tu | |
| 7,373,246 B2 | 5/2008 | O'Clair | |
| 7,379,729 B2* | 5/2008 | Holland et al. | 455/404.2 |
| 7,409,219 B2 | 8/2008 | Levitan | |
| 7,480,566 B2 | 1/2009 | Laverty | |
| 7,546,202 B2 | 6/2009 | Oh | |
| 7,565,239 B2 | 7/2009 | De Silva et al. | |
| 7,627,656 B1* | 12/2009 | Anand et al. | 709/220 |
| 7,706,977 B2 | 4/2010 | Soehren | |
| 7,853,403 B2 | 12/2010 | Tanaka | |
| 7,873,370 B2* | 1/2011 | Shim | 455/456.2 |
| 8,095,434 B1 | 1/2012 | Puttick | |
| 8,265,864 B1 | 9/2012 | Kaufman | |
| 8,296,062 B2 | 10/2012 | Yamane | |
| 2001/0021894 A1 | 9/2001 | Sakamoto | |
| 2001/0038626 A1* | 11/2001 | Dynarski et al. | 370/356 |
| 2001/0047241 A1 | 11/2001 | Khavakh | |
| 2001/0048387 A1* | 12/2001 | Sheynblat | 342/357.09 |
| 2002/0021231 A1 | 2/2002 | Schlager | |
| 2002/0037716 A1 | 3/2002 | McKenna | |
| 2002/0042819 A1 | 4/2002 | Reichert | |
| 2002/0082774 A1* | 6/2002 | Bloebaum | 701/213 |
| 2002/0098851 A1 | 7/2002 | Walczak | |
| 2002/0147023 A1* | 10/2002 | Sawada et al. | 455/456 |
| 2002/0171581 A1* | 11/2002 | Sheynblat et al. | 342/357.09 |
| 2002/0190861 A1 | 12/2002 | Wentworth | |
| 2003/0033083 A1 | 2/2003 | Nakashima | |
| 2003/0050075 A1 | 3/2003 | Rangarajan | |
| 2003/0055555 A1 | 3/2003 | Knockeart | |
| 2003/0071728 A1 | 4/2003 | McDonald | |
| 2003/0095525 A1 | 5/2003 | Lavin | |
| 2003/0128211 A1 | 7/2003 | Watanabe | |
| 2003/0182052 A1 | 9/2003 | Delorme | |
| 2003/0227911 A1* | 12/2003 | Trossen | 370/352 |
| 2004/0003125 A1* | 1/2004 | Ichimura | 709/249 |
| 2004/0023645 A1 | 2/2004 | Olsen | |
| 2004/0027258 A1 | 2/2004 | Pechatnikov | |
| 2004/0067773 A1* | 4/2004 | Rachabathuni et al. | 455/560 |
| 2004/0105433 A1* | 6/2004 | Seo | 370/352 |
| 2004/0158829 A1 | 8/2004 | Beresin | |
| 2004/0183724 A1* | 9/2004 | Sheynblat | 342/357.15 |
| 2004/0185870 A1 | 9/2004 | Matsuda | |
| 2004/0203603 A1* | 10/2004 | Pierce et al. | 455/411 |
| 2004/0203873 A1* | 10/2004 | H. Gray | 455/456.1 |
| 2004/0215641 A1 | 10/2004 | Kothuri | |
| 2004/0224702 A1* | 11/2004 | Chaskar | 455/456.3 |
| 2004/0225437 A1 | 11/2004 | Endo | |
| 2004/0249568 A1 | 12/2004 | Endo | |
| 2004/0266455 A1* | 12/2004 | Lee et al. | 455/456.1 |
| 2005/0038876 A1 | 2/2005 | Chaudhuri | |
| 2005/0105496 A1* | 5/2005 | Ambrosino | 370/338 |
| 2005/0148342 A1* | 7/2005 | Sylvain | 455/456.3 |
| 2005/0149253 A1 | 7/2005 | Nambata | |
| 2005/0188333 A1 | 8/2005 | Hunleth | |
| 2005/0245249 A1* | 11/2005 | Wierman et al. | 455/419 |
| 2005/0251331 A1 | 11/2005 | Kreft | |
| 2005/0288033 A1 | 12/2005 | McNew | |
| 2006/0015513 A1* | 1/2006 | Poyhonen et al. | 707/100 |
| 2006/0023626 A1 | 2/2006 | Krausz | |
| 2006/0055693 A1 | 3/2006 | Sylthe | |
| 2006/0064235 A1 | 3/2006 | Ishikawa | |
| 2006/0089788 A1 | 4/2006 | Laverty | |
| 2006/0089792 A1 | 4/2006 | Manber et al. | |
| 2006/0105782 A1 | 5/2006 | Brock | |
| 2006/0116818 A1 | 6/2006 | Chao et al. | 701/211 |
| 2006/0135178 A1 | 6/2006 | Allyn | |
| 2006/0155679 A1 | 7/2006 | Kothuri | |
| 2006/0167616 A1 | 7/2006 | Yamane | |
| 2006/0167621 A1 | 7/2006 | Dale | |
| 2006/0173841 A1 | 8/2006 | Bill | |
| 2006/0174209 A1 | 8/2006 | Barros | |
| 2006/0200304 A1 | 9/2006 | Oh | |
| 2006/0200308 A1 | 9/2006 | Arutunian | |
| 2006/0206586 A1* | 9/2006 | Ling et al. | 709/219 |
| 2006/0223518 A1 | 10/2006 | Haney | |
| 2006/0229802 A1 | 10/2006 | Vertelney et al. | |
| 2006/0246922 A1 | 11/2006 | Gasbarro | |
| 2006/0251008 A1* | 11/2006 | Wu et al. | 370/328 |
| 2006/0253247 A1 | 11/2006 | De Silva et al. | |
| 2007/0010942 A1 | 1/2007 | Bill | |
| 2007/0015518 A1* | 1/2007 | Winter et al. | 455/456.1 |
| 2007/0036318 A1* | 2/2007 | Gits et al. | 379/202.01 |
| 2007/0072620 A1 | 3/2007 | Levitan | |
| 2007/0083649 A1 | 4/2007 | Zuzga | |
| 2007/0105554 A1* | 5/2007 | Clark et al. | 455/435.1 |
| 2007/0118520 A1 | 5/2007 | Bliss | |
| 2007/0153983 A1* | 7/2007 | Bloebaum et al. | 379/33 |
| 2007/0155401 A1* | 7/2007 | Ward et al. | 455/456.1 |
| 2007/0156334 A1 | 7/2007 | Vu | |
| 2007/0162942 A1 | 7/2007 | Hamynen | |
| 2007/0174259 A1 | 7/2007 | Amjadi | |
| 2007/0185985 A1* | 8/2007 | Shim et al. | 709/223 |
| 2007/0213043 A1* | 9/2007 | Son | 455/422.1 |
| 2007/0219706 A1 | 9/2007 | Sheynblat | |
| 2007/0219708 A1 | 9/2007 | Brasche | |
| 2007/0233817 A1 | 10/2007 | Johnson et al. | |
| 2007/0238472 A1* | 10/2007 | Wanless | 455/461 |
| 2007/0253642 A1 | 11/2007 | Berrill | |
| 2007/0281707 A1* | 12/2007 | Thomson et al. | 455/446 |
| 2007/0288613 A1* | 12/2007 | Sudame et al. | 709/223 |
| 2008/0071465 A1 | 3/2008 | Chapman | |
| 2008/0082262 A1 | 4/2008 | Silva et al. | |
| 2008/0112372 A1* | 5/2008 | Thomson et al. | 370/338 |
| 2008/0112551 A1* | 5/2008 | Forbes et al. | 379/142.1 |
| 2008/0113671 A1* | 5/2008 | Ghozati et al. | 455/456.1 |
| 2008/0130597 A1 | 6/2008 | Kalhan | 370/338 |
| 2008/0139114 A1* | 6/2008 | Ranganathan | 455/41.1 |
| 2008/0140307 A1 | 6/2008 | Chen | |
| 2008/0146207 A1* | 6/2008 | Razdan | 455/416 |
| 2008/0153550 A1* | 6/2008 | Otaka et al. | 455/566 |
| 2008/0171559 A1* | 7/2008 | Frank et al. | 455/456.5 |
| 2008/0177462 A1 | 7/2008 | Yoshioka | |
| 2008/0177839 A1* | 7/2008 | Chang et al. | 709/205 |
| 2008/0218407 A1 | 9/2008 | Norda | |
| 2008/0227463 A1* | 9/2008 | Hizume et al. | 455/456.1 |
| 2008/0249983 A1 | 10/2008 | Meisels | |
| 2008/0261560 A1* | 10/2008 | Ruckart | 455/411 |
| 2008/0268822 A1 | 10/2008 | Johnson | |
| 2008/0270366 A1 | 10/2008 | Frank | |
| 2008/0275637 A1* | 11/2008 | Kim et al. | 701/201 |
| 2008/0280599 A1 | 11/2008 | Cheng | |
| 2008/0307445 A1* | 12/2008 | Garg | 719/328 |
| 2008/0319652 A1 | 12/2008 | Moshfeghi | |
| 2008/0319653 A1 | 12/2008 | Moshfeghi | |
| 2009/0009397 A1 | 1/2009 | Taylor | |
| 2009/0029693 A1 | 1/2009 | Liwell | |
| 2009/0055087 A1 | 2/2009 | Beacher | |
| 2009/0061852 A1 | 3/2009 | Feher | |
| 2009/0061862 A1* | 3/2009 | Alberth et al. | 455/434 |
| 2009/0100037 A1 | 4/2009 | Scheibe | |
| 2009/0144247 A1 | 6/2009 | Wistrand et al. | |
| 2009/0192702 A1 | 7/2009 | Bourne | |
| 2009/0237307 A1 | 9/2009 | Tsai | |

(56) References Cited

U.S. PATENT DOCUMENTS

| | | |
|---|---|---|
| 2009/0298505 A1* | 12/2009 | Drane et al. .................. 455/446 |
| 2009/0325615 A1 | 12/2009 | Mckay |
| 2010/0037057 A1 | 2/2010 | Shim et al. |
| 2010/0094550 A1 | 4/2010 | Tsurutome et al. |
| 2010/0113072 A1 | 5/2010 | Gibson |
| 2010/0214117 A1 | 8/2010 | Hazzani |
| 2011/0003578 A1 | 1/2011 | Chen et al. |
| 2011/0035141 A1 | 2/2011 | Barker |

OTHER PUBLICATIONS

Guim, Mark; GPS Lock Taking Too Long? Try Google Location Server supl.google.com,Dec. 16, 2009, http://thenokiablog.com/2009/12/16/google-location-server-supl/.*

Internal Search Report received in PCT/US2008/12621 dated Jan. 8, 2009.

International Search Report in PCT/US2009/05486 dated Jan. 21, 2010.

International Search Report received in PCT/US2009/02016 dated May 27, 2009.

International Search Report in PCT/US2008/10543 dated Aug. 19, 2010.

International Search Report in PCT/US2008/10542 dated Aug. 19, 2010.

PCT International Search Report in PCT/US2009/05487 dated Nov. 17, 2009.

International Search Report received in PCT/US2008/10542 dated Nov. 26, 2008.

Internal Search Report received in PCT/US2008/10543 dated Dec. 11, 2008.

European Search Report received in European Appl. No. 09819547.2 dated Oct. 16, 2012.

European Search Report received in European Appl. No. 09819546.4 dated Oct. 15, 2012.

John Krumm et al, "Map Matching with Travel Time Constraints", SAE 2007 World Congress, Apr. 19, 2007.

Ahern et al., "World Explorer: Visualizing Aggregate Data from Unstructured Text in Geo-Referenced Collections," Jun. 18-23, 2007, ACM, JCDL'07.

* cited by examiner

DYNAMIC CONFIGURATION OF MOBILE STATION LOCATION SERVICES

The present application claims priority from U.S. Provisional Application 60/960,019, entitled "DYNAMIC CONFIGURATION OF MOBILE STATION LOCATION SERVICES" to Gill et al., filed Sep. 11, 2007, the entirety of which is expressly incorporated herein by reference.

BACKGROUND OF THE INVENTION

1. Field of the Invention

This invention relates generally to location based wireless services, and more specifically, to location enabled applications for wireless mobile devices.

2. Background of Related Art

Most mobile station (cell phone) GPS implementations depend on network access to a 'location server' for base station almanac (BSA) data and/or computational support. The IP address, port and type of connection must be known to the mobile station in order for the mobile station software and GPS chipset to communicate with this location server. Many Tier 1 carriers pre-configure their devices with this information.

Most location based applications rely on the device being pre-configured by the carrier with the correct location server configuration information. If this configuration is incorrect or does not exist, location services are not available.

The location configuration is static and must be established in advance by the wireless carrier. Existing GPS capable phones cannot be reconfigured (except manually) to access a new location server. When TCS sells its location platform into a new carrier, it is not possible to turn on location services on devices that are already deployed.

SUMMARY OF THE INVENTION

In accordance with the principles of the invention, a method and apparatus for configuring a mobile device comprises transmitting a request for location configuration data. The location configuration data is received in response to the request for location configuration data. Navigation hardware is initialized with the location configuration data.

In accordance with the principles of the invention, a system for configuring a mobile device comprises a mobile device to transmit a request for location configuration data, a location configuration data server to receive the request for location configuration data and to formulate a database query, and a database to store the location configuration data. A wireless network communicates the request for location configuration data and the location configuration data between the mobile device and the location configuration server.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

This invention addresses two problems related to management of the location server configuration data on the mobile station. First, many Tier 2 carriers are not able, for business and/or technical reasons, to pre-configure their devices with the required information. This places the burden of configuration on the application provider. Second, location services should be available even when the mobile station is roaming on a partner network that maintains its own location server and proprietary BSA data.

Both of these problems are resolved by a mechanism that dynamically establishes the location server configuration based on the current carrier network.

In accordance with the principles of the present invention, on startup, the mobile station application will determine the current carrier network and submit a query to an application server that will return the correct location server configuration for the specified network. This information will be used on the mobile station to dynamically configure the device through the available GPS chipset API.

Very importantly, this invention disclosed herein allows applications to run on devices that have not been pre-configured with a location server configuration. In addition, applications using this invention are able to provide location services outside of the primary network as long as alternate location servers for the current network are available.

The present invention has particularly application for developers of location enabled wireless applications.

Figure 1:
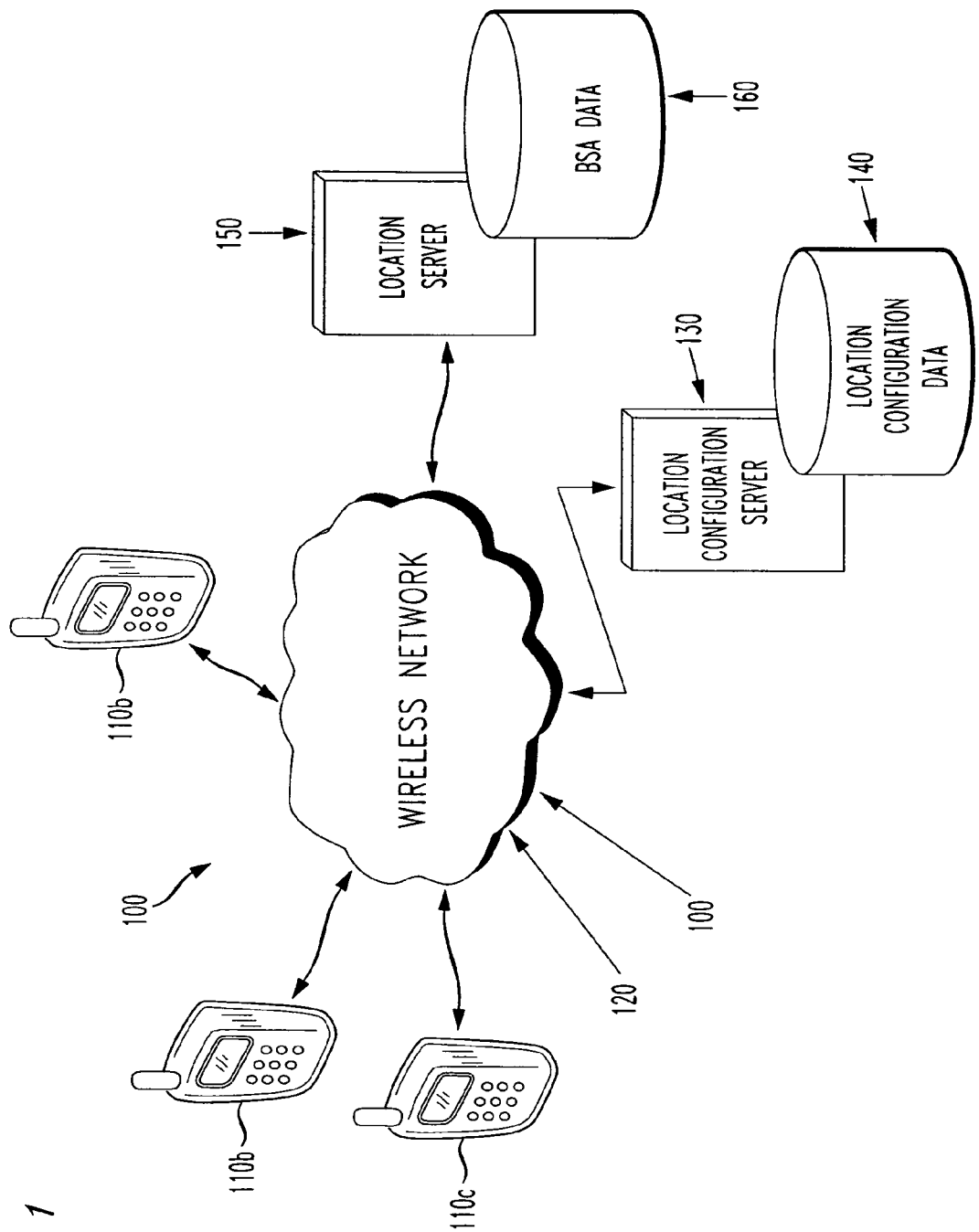
FIG. 1 shows a system for transmitting a request for and receiving location configuration data, in accordance with the principles of the present invention.

FIG. 1 shows a system for transmitting a request for and receiving location configuration data, in accordance with the principles of the present invention.

In particular, as shown in FIG. 1, a system 100 for transmitting a request for and receiving location configuration data can include various wireless devices 110*a*, 110*b*, and 110*c*, a wireless network 120, a location configuration server 130, and a location configuration database 140.

Instead of manually entering location configuration data into any of wireless devices 110*a*, 110*b*, and 110*c* or being pre-configured with location configuration data, in accordance with the principles of the present invention a request for location configuration data is transmitted by any of wireless devices 110*a*, 110*b*, and 110*c*. The transmitted request for location configuration data is packaged into one or more data packets for transmission over the wireless network 120 to location configuration server 130, as is known within the art.

The various wireless devices 110*a*, 110*b*, and 110*c* can include any class of device such as, cellular telephones, personal data assistants (PDAs), laptop computers, etc., that contain navigation hardware that require location configuration data for access to a location server. As discussed above, such a location server 150 can provide base station almanac (BSA) data 160 and/or computational support.

The various wireless devices 110*a*, 110*b*, and 110*c* must be properly configured with an IP address, port and type of connection to the mobile station. Proper configuration allows for mobile station software used by the various wireless devices 110a, 110b, and 110c and navigation hardware, such as a GPS chipset, to communicate with the location server 150.

A client application operating on the various wireless devices 110a, 110b, and 110c may receive multiple configurations in a single response. These configurations may be labeled as 'Test' or "Production" location servers or may provide secondary server configuration data to be used if the primary server is not available.

Wireless network 120 allows the various wireless devices 110a, 110b, and 110c to communicate with a location configuration server 130. Any wireless network can be employed that allows data communications for transmitting a request for and receiving location configuration data between the various wireless devices 110a, 110b, and 110c and a location configuration server 130.

Location configuration server 130 receives requests for location configuration data from wireless network 120. A database query is formulated by the location configuration server 130 from parameters associated with the received request for location configuration data. Such parameters can include a carrier network identification and at least one application identification. The database query is submitted by the location configuration server 130 to the location configuration database 140 to search the content of location configuration database 140 for entries that match the received parameters, as is known within the art.

The location configuration database 140 can be managed by any number of database programs, such as, Oracle, Sybase, mySQL, Lotus Approach, Microsoft Access, Filemaker, etc. Any database program that allows for the retrieval of location configuration data from parameters can be used with the invention; parameters such as carrier network identification and at least one application identification.

Location configuration server 130 and location configuration database 140 are described herein for simplicity as being separate components. However, location configuration database 140 can exist within the location configuration server 130. In such an instance, the description above of location configuration server 130 submitting a database query to the location configuration database 140 would remain the same.

Figure 2:
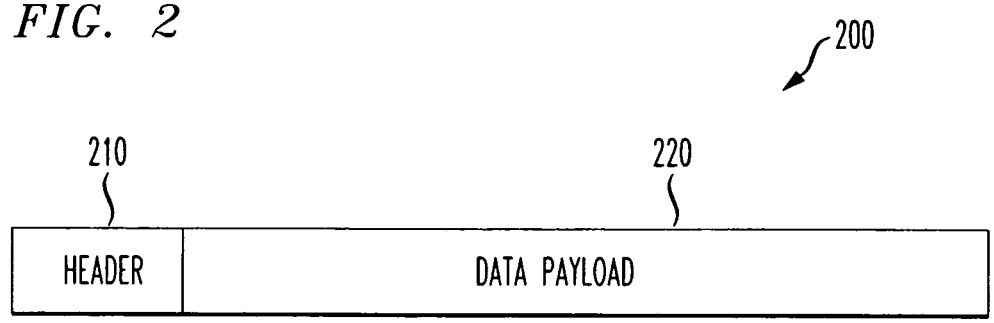
FIG. 2 shows an exemplary data packet for submitting a request for location configuration data, in accordance with the principles of the present invention.

FIG. 2 shows an exemplary data packet for submitting a request for location configuration data, in accordance with the principles of the present invention.

In particular, as shown in FIG. 2, a data packet for submitting a request for location configuration data 200 can include a header portion 210 and a data payload portion 220.

Header portion 210 can include source and destination addresses, error-checking fields, etc., as is well known within the art.

Data payload portion 220 can include carrier network identification data and at least one application identification that are both associated with a various wireless devices 110a, 110b, and 110c transmitting a request for location configuration data.

Depending upon the wireless network employed and network traffic therein, the data packet for submitting a request for location configuration data 200 may be fragmented into a plurality of data packets. The plurality of data packets are then reassembled at the receiving end, as is known within the art.

Figure 3:
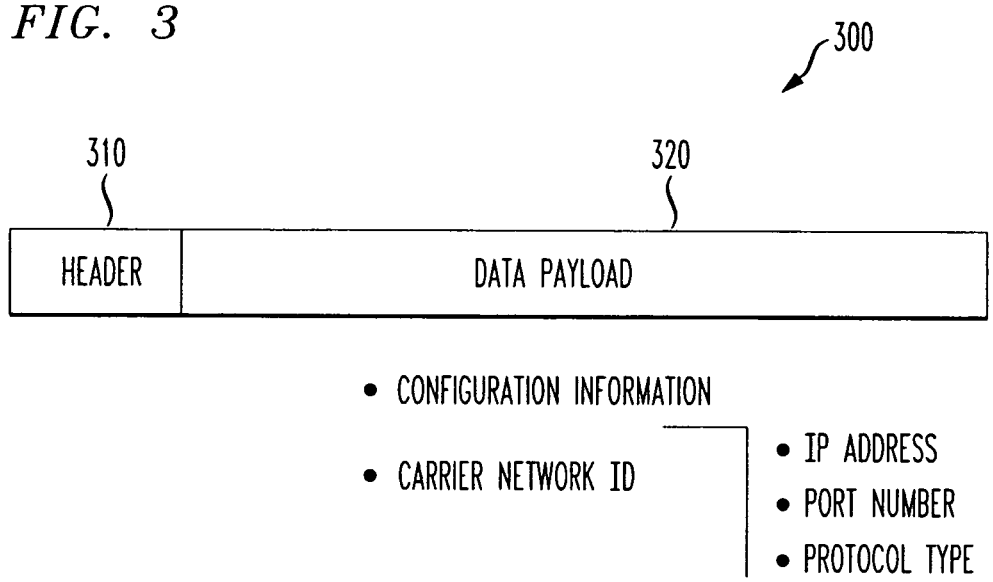
FIG. 3 shows an exemplary data packet for transmitting location configuration data, in accordance with the principles of the present invention.

FIG. 3 shows an exemplary data packet for transmitting location configuration data, in accordance with the principles of the present invention.

In particular, as shown in FIG. 3, a data packet for transmitted location configuration data 300 can include a header portion 310 and a data payload portion 320.

Header portion 310 can include source and destination addresses, error-checking fields, etc., as is well known within the art.

Data payload portion 320 can include configuration information and carrier network identification. The configuration information can include an Internet Protocol (IP) address, a port number, and a protocol type. A plurality of configuration data can be returned in response to a single request for location configuration data, respectively corresponding to application identification supplied in the request for location configuration data 200.

Depending upon the wireless network employed and network traffic therein, the data packet for transmitted location configuration data 300 may be fragmented into a plurality of data packets. The plurality of data packets are then reassembled at the receiving end, as is known within the art.

Figure 4:
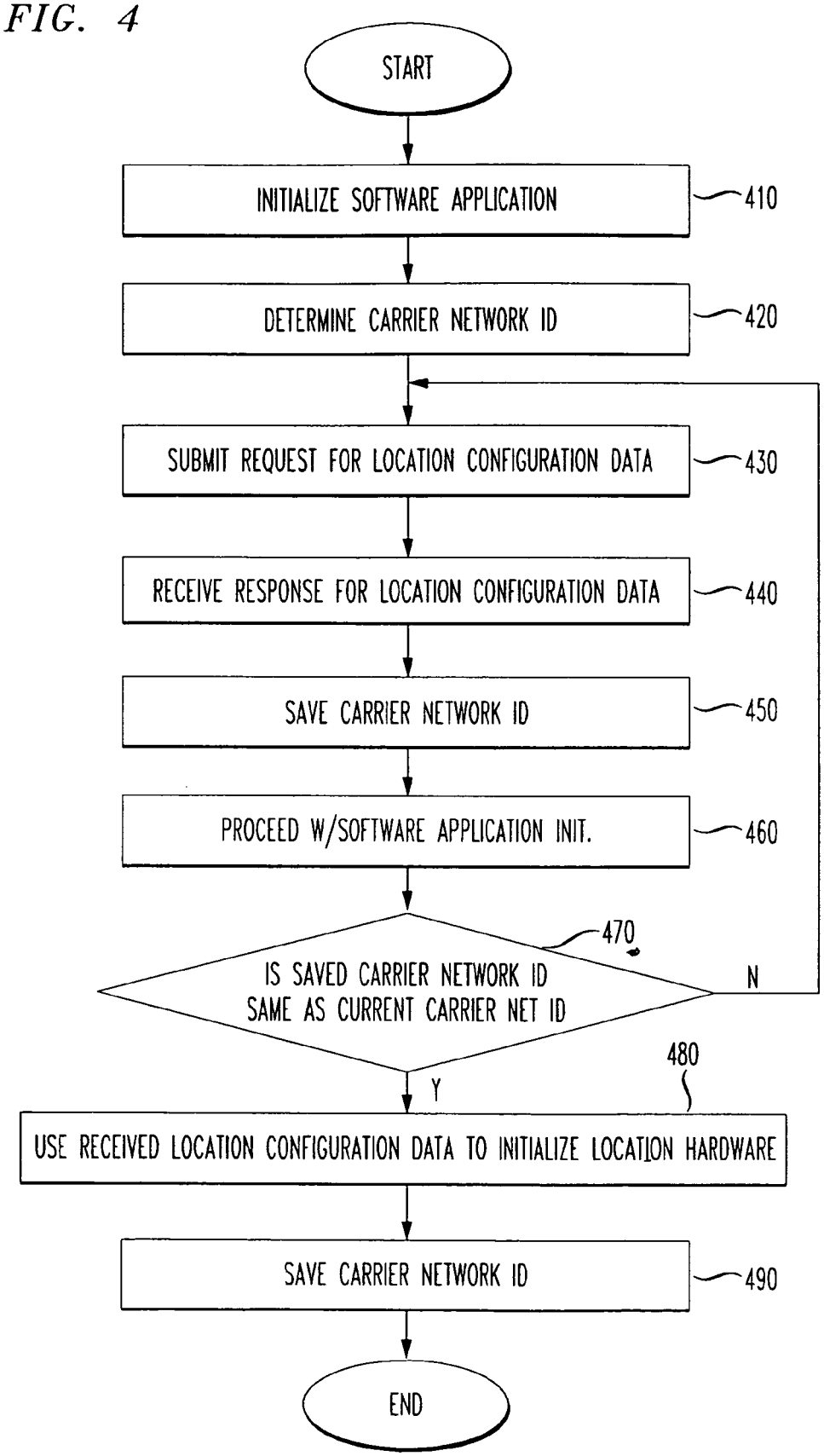
FIG. 4 shows an exemplary method of submitting a request for location configuration information, in accordance with the principles of the present invention.

FIG. 4 shows an exemplary method of submitting a request for location configuration information, in accordance with the principles of the present invention.

In particular, a method of submitting a request for location configuration information 400 begins with step 410, of FIG. 4, in which a software application at any of wireless devices 110a, 110b, and 110c is initialized.

In step 420, software within any of wireless devices 110a, 110b, and 110c determines the current carrier network identification associated with any of wireless devices 110a, 110b, and 110c. As is known within the art, carrier network identifications can often change as any of wireless devices 110a, 110b, and 110c roam.

In step 430, a request for location configuration data is formulated at any of wireless devices 110a, 110b, and 110c. The request for location configuration data is submitted to the location configuration server 130 using the exemplary data packet for submitting a request for location configuration data 200, shown in FIG. 2.

A response to the request for location configuration data submitted to the location configuration server 130 is received in step 440. The response to the request for location configuration data is received from the location configuration server 130 using the exemplary data packet for transmitting location configuration data 300, shown in FIG. 3.

In step 450, the carrier network identification received in step 440 is saved within memory in any of wireless devices 110a, 110b, and 110c.

In step 460, the initialization of software application that began in step 410 proceeds.

A determination is made if the current carrier network identification is the same as the carrier network identification saved in step 450, in step 470. As discussed above, a carrier network identification could possible change at some time between steps 420 and 450 because of a roaming condition. If the determination in step 470 is that the current carrier network identification is not the same as the carrier network identification saved in step 450, the method of submitting a request for location configuration information 400 branches to step 420. If the determination in step 470 is that the current carrier network identification is are the same as the carrier network identification saved in step 450, the method of submitting a request for location configuration information 400 branches to step 480.

In step 480, the location configuration data received in step 440 is used to initialize/re-initialize navigation hardware associated with any of wireless devices 110a, 110b, and 110c, such as a GPS chipset.

The carrier network identification is saved in step 490. Any of wireless devices 110a, 110b, and 110c submitting a request for location configuration data are then configured. The method of submitting a request for location configuration information 400 ends.

Figure 5:
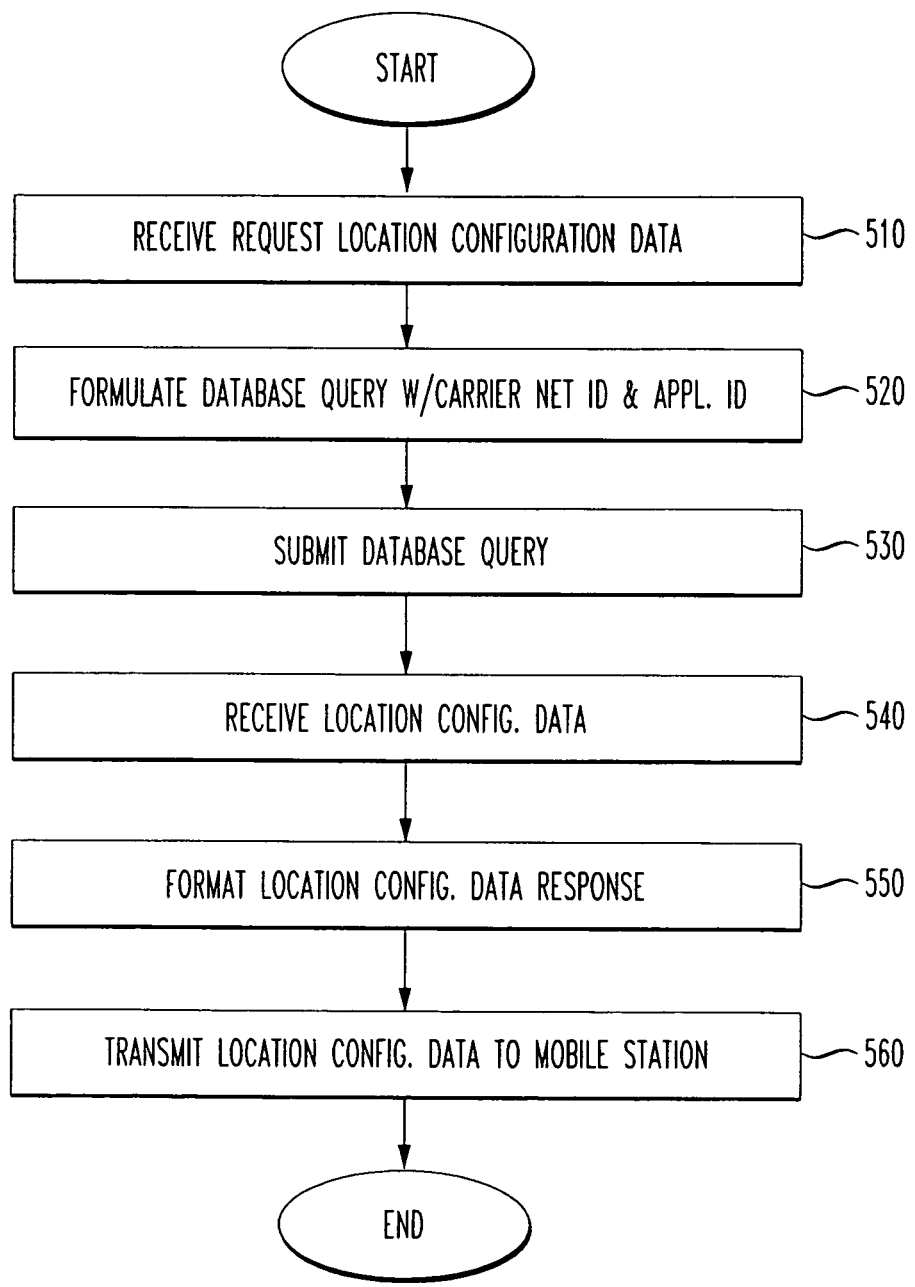
FIG. 5 shows an exemplary method of responding to a request for location configuration information, in accordance with the principles of the present invention.

FIG. 5 shows an exemplary method of responding to a request for location configuration information, in accordance with the principles of the present invention.

In particular, a method of responding to a request for location configuration information 500 begins with step 510, of FIG. 5, in which a request for location configuration data is received by a location configuration server 130. The request for location configuration data is submitted to the location configuration server 130 using the exemplary data packet for submitting a request for location configuration data 200, shown in FIG. 2.

In step 520, a database query is formulated by the location configuration server 130 with the parameters supplied in the data packet for submitting a request for location configuration data 200.

In step 530, the database query formulated in step 520 is submitted to location configuration database 140.

In response to the submission of the database query in step 530, in step 540 at least one set of location configuration data is received by the location configuration server 130 from the location configuration database 140.

In step 550, the location configuration data received in step 530 is formatted into the exemplary data packet for transmitting location configuration data 300, shown in FIG. 3.

In step 560, the exemplary data packet for transmitting location configuration data 300, shown in FIG. 3, is transmitted from location configuration server 130 to any of wireless devices 110*a*, 110*b*, and 110*c*. The method of responding to a request for location configuration information 500 then ends.

The methods disclosed in FIGS. 4 and 5 can be implemented in software, in hardware or a combination of hardware and software. Hardware implementation can include use of one or more of a Application-Specific Integrated Circuit (ASIC), Programmable Logic Array (PAL), Electrically Erasable Programmable Read Only Memory (EEPROM), Read Only Memory (ROM), Field Programmable Gate Array (FPGA), etc. Software implementation can include use of long term storage, short term storage, a processing unit, etc. associated with a wireless device.

While the invention has been described with reference to the exemplary embodiments thereof, those skilled in the art will be able to make various modifications to the described embodiments of the invention without departing from the true spirit and scope of the invention.

What is claimed is:

1. A method of configuring a mobile device, comprising:
    transmitting a mobile device configuration request for access configuration data, to an access configuration server, to configure a software application in a mobile device to access a location server, said request for access configuration data including at least one of a carrier network identification and an application identification;
    receiving said access configuration data in response to said request for access configuration data;
    when a current network identification matches a received network identification associated with said access configuration data, initializing said navigation hardware with said access configuration data, and when said current network identification does not match said carrier network identification, transmitting another request for access configuration data to said access configuration server; and
    configuring said software application, associated with navigation hardware in said mobile device, with latest access configuration data received.

2. The method of configuring a mobile device according to claim 1, wherein said access configuration data comprises:
    an Internet Protocol (IP) address;
    a port number; and
    a protocol type.

3. The method of configuring a mobile device according to claim 1, wherein:
    said mobile device is a cellular telephone.

4. The method of configuring a mobile device according to claim 1, wherein:
    said navigation hardware is a Global Positioning System (GPS) chipset.

5. Apparatus for configuring a mobile device, comprising:
    means for transmitting a mobile device configuration request for access configuration data, to an access configuration server, to configure a software application in a mobile device to access a location server, said request for access configuration data including at least one of a carrier network identification and an application identification;
    means for receiving said access configuration data in response to said request for access configuration data;
    means for initializing said navigation hardware with said access configuration data when a current network identification matches a received network identification associated with said access configuration data, and for transmitting another request for access configuration data to said access configuration server when said current network identification does not match said carrier network identification; and
    means for configuring said software application, associated with navigation hardware in said mobile device, with latest access configuration data received.

6. The apparatus for configuring a mobile device according to claim 5, wherein said access configuration data comprises:
    an Internet Protocol (IP) address;
    a port number; and
    a protocol type.

7. The apparatus for configuring a mobile device according to claim 5, wherein:
    said mobile device is a cellular telephone.

8. The apparatus for configuring a mobile device according to claim 5, wherein:
    said navigation hardware is a Global Positioning System (GPS) chipset.

9. A system for configuring a mobile device, comprising: a mobile device to transmit a request for access configuration data, to an access configuration server, to configure a software application in a mobile device to access a location server, said request for access configuration data including at least one of a carrier network identification and an application identification;
    an access configuration server to receive said request for access configuration data and to formulate a database query;
    when a current network identification matches a received network identification associated with said access configuration data, initializing said navigation hardware with said access configuration data, and when said current network identification does not match said carrier network identification, transmitting another request for access configuration data to said access configuration server;
    a database to store said access configuration data; and a wireless network to communicate said request for access configuration data and said access configuration data between said mobile device and said access configuration server, to configure said software application, associated with navigation hardware in said mobile device, with latest access configuration data received.

10. The system for configuring a mobile device according to claim 9, wherein said access configuration data comprises:
an Internet Protocol (IP) address;
a port number; and
a protocol type.

11. The system for configuring a mobile device according to claim 9, wherein:
said mobile device is a cellular telephone.

12. The system for configuring a mobile device according to claim 9, further comprising:
a Global Positioning System (GPS) chipset in said mobile device.

* * * * *